United States Patent
Kloos et al.

(10) Patent No.: US 8,995,548 B2
(45) Date of Patent: Mar. 31, 2015

(54) METHOD AND APPARATUS FOR CHANNEL SOUNDING IN AN ORTHOGONAL FREQUENCY DIVISION MULTIPLEXING COMMUNICATION SYSTEM

(75) Inventors: Michael N. Kloos, Belvidere, IL (US); Mark G. Spiotta, Wheaton, IL (US); Frederick W. Vook, Schaumburg, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1451 days.

(21) Appl. No.: 12/351,926

(22) Filed: Jan. 12, 2009

(65) Prior Publication Data
US 2009/0225879 A1 Sep. 10, 2009

Related U.S. Application Data

(60) Provisional application No. 61/035,241, filed on Mar. 10, 2008.

(51) Int. Cl.
| H04B 7/02 | (2006.01) |
| H04L 5/00 | (2006.01) |
| H04L 25/02 | (2006.01) |

(52) U.S. Cl.
CPC ........... *H04L 5/0048* (2013.01); *H04L 25/0224* (2013.01)
USPC ........................................... 375/267; 375/260

(58) Field of Classification Search
USPC .......... 375/260, 262, 265, 267; 370/208, 337, 370/347
See application file for complete search history.

(56) References Cited

U.S. PATENT DOCUMENTS

| 7,590,045 | B2 | 9/2009 | Oh et al. | |
| 7,885,631 | B2* | 2/2011 | Yang et al. | 455/312 |
| 8,165,081 | B2 | 4/2012 | Papasakellariou et al. | |
| 2003/0193889 | A1 | 10/2003 | Jacobsen | |
| 2005/0170781 | A1 | 8/2005 | Jacobsen et al. | |
| 2006/0035643 | A1 | 2/2006 | Vook et al. | |
| 2007/0105508 | A1 | 5/2007 | Tong et al. | |
| 2007/0263735 | A1 | 11/2007 | Tong et al. | |
| 2008/0009285 | A1* | 1/2008 | Cho et al. | 455/435.1 |
| 2008/0075032 | A1* | 3/2008 | Balachandran et al. | 370/317 |
| 2008/0123589 | A1* | 5/2008 | Lee et al. | 370/329 |
| 2009/0080351 | A1* | 3/2009 | Ryu et al. | 370/312 |
| 2009/0122777 | A1* | 5/2009 | Tao et al. | 370/343 |

(Continued)

FOREIGN PATENT DOCUMENTS

| KR | 1020090085549 A | 8/2009 |
| WO | 2005096531 A1 | 10/2005 |
| WO | 2008002436 A2 | 1/2008 |

OTHER PUBLICATIONS

KIPO's Notice of Preliminary Rejection (English Translation), Aug. 17, 2011, all pages.
Korean Intellectual Property Office, International Search Report and Written Opinion for PCT Appln No. PCT/US2009/035843, mailed Sep. 30, 2009 (11 pages).
IEEE Standards, IEEE Standard for Local and Metropolitan Area Networks Part 16: Air Interface for Fixed Broadband Wireless Access Systems, IEEE Std. 802.16—2004, Revised Oct. 1, 2004 (895 pages).

(Continued)

*Primary Examiner* — Young T. Tse
(74) *Attorney, Agent, or Firm* — Faegre Baker Daniels LLP (57) ABSTRACT

An Orthogonal Frequency Division Multiplexing communication system is provided that schedules a transmission of uplink sounding signals or channel quality feedback signals in sounding intervals, or sounding zones, that are outside of the sub-frames, thereby preserving sub-frame capacity for other overhead and data transmissions.

21 Claims, 5 Drawing Sheets

(56) References Cited

U.S. PATENT DOCUMENTS

| | | | |
|---|---|---|---|
| 2009/0124290 A1* | 5/2009 | Tao et al. | 455/562.1 |
| 2009/0196203 A1* | 8/2009 | Taira et al. | 370/280 |
| 2009/0209256 A1* | 8/2009 | Nakashima et al. | 455/436 |
| 2009/0316633 A1* | 12/2009 | Kato et al. | 370/329 |
| 2010/0046413 A1* | 2/2010 | Jin et al. | 370/315 |
| 2010/0080266 A1* | 4/2010 | Zhang et al. | 375/140 |
| 2010/0214992 A1* | 8/2010 | Hart et al. | 370/329 |

OTHER PUBLICATIONS

IEEE Standards, IEEE Standard for Local and Metropolitan Area Networks Part 16: Air Interface for Fixed Broadband Wireless Access Systems, IEEE Std. 802.16e—2005, Amendment 2: Physical and Medium Access Control Layers for Combined Fixed and Mobile Operation in Licensed Bands; Cover page—p. 11, Section 8.4.6.2.7, Section 8.4.5.4—Section 8.4.5.4.2, Section 11.8.3.7, Revised Feb. 28, 2006 (79 pages).

* cited by examiner

METHOD AND APPARATUS FOR CHANNEL SOUNDING IN AN ORTHOGONAL FREQUENCY DIVISION MULTIPLEXING COMMUNICATION SYSTEM

CROSS-REFERENCE(S) TO RELATED APPLICATION(S)

The present application claims priority from provisional application Ser. No. 61/035,241, entitled "METHOD AND APPARATUS FOR CHANNEL SOUNDING IN AN ORTHOGONAL FREQUENCY DIVISION MULTIPLEXING COMMUNICATION SYSTEM," filed Mar. 10, 2008, which is commonly owned and incorporated herein by reference in its entirety.

FIELD OF THE INVENTION

The present invention relates generally to Orthogonal Frequency Division Multiplexing (OFDM) communication systems, and, in particular, to an exchange of channel response information in an OFDM communication system.

BACKGROUND OF THE INVENTION

The IEEE (Institute of Electrical and Electronics Engineers) 802.16 standards propose using an Orthogonal Frequency Division Multiple Access (OFDMA) for transmission of data over an air interface. OFDMA has also been proposed for use in 3GPP (Third Generation Partnership Project) Evolution communication systems. In an OFDMA communication system, a frequency bandwidth is split into multiple contiguous frequency sub-carriers, wherein groups of sub-carriers are arranged in logical frequency sub-bands (not necessarily contiguous in frequency), each sub-band comprising multiple orthogonal frequency sub-carriers, that are transmitted simultaneously. A user may then be assigned one or more of the frequency sub-bands for an exchange of user information, thereby permitting multiple users to transmit simultaneously on the different sub-bands. These sub-bands are orthogonal to each other, and thus inter-user and intra-cell interference is minimized.

In order to provide more efficient use of the channel bandwidth, a radio access network (RAN) may transmit the data using multiple antennas and a user equipment (UE) may receive the transmitted data using multiple receiving antennas, referred to as Multiple Input-Multiple Output (MIMO). In an OFDMA system that implements MIMO, a serving RAN may beamform a downlink signal for transmission to each UE via an antenna array and over an associated sub-band. In order to beamform the signal, the RAN maintains a set of (transmit) weights in association with each UE and each element of the antenna array. When the RAN transmits to the UE, the RAN applies an appropriate weight, of the set of weights, to the signal applied to each element of the array. In order to determine the set of weights for each UE, the RAN measures uplink channel conditions in association with the UE. That is, for any given measuring period, such as a Transmission Time Interval (TTI) (also known as a sub-frame), a UE served by the RAN transmits a pre-determined symbol to the RAN in a sub-band allocated to the UE by the RAN. Based on a comparison of the symbol received to the symbol that the RAN knows was transmitted, the RAN is able to estimate channel conditions for the UE in the allocated sub-band and determine a set of weights for a downlink transmission to the UE in the sub-band.

Figure 1:
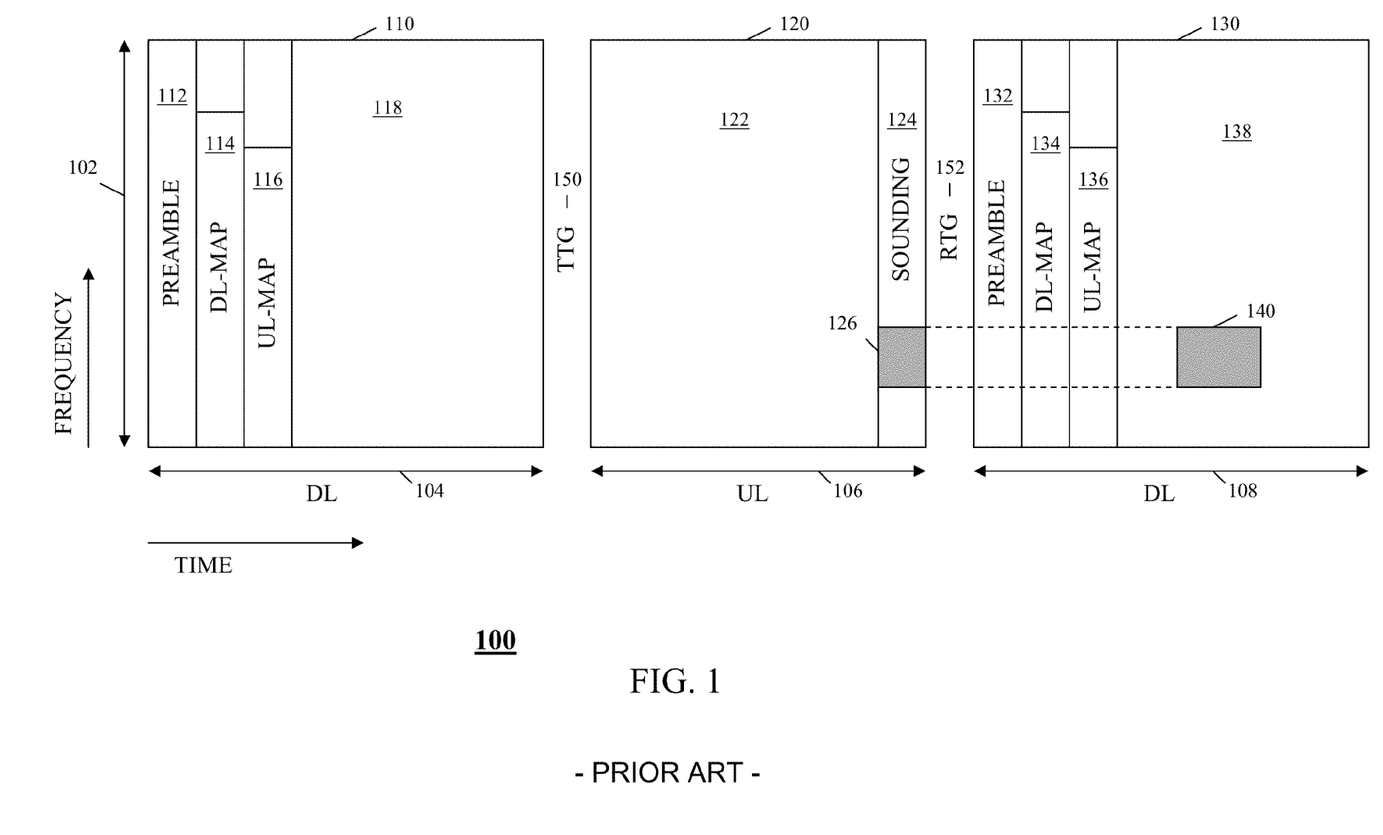
FIG. 1 is a block diagram of a scheme for channel sounding of a frequency bandwidth utilized by a prior art Orthogonal Frequency Division Multiple Access communication system.

For example, FIG. 1 is a block diagram 100 depicting a channel sounding of a frequency bandwidth 102 in accordance with the prior art. As depicted in FIG. 1, during a first transmission interval 104 a RAN transmits a first downlink (DL) sub-frame 110. During a next, second transmission interval 106 a UE served by the RAN transmits an uplink (UL) sub-frame 120 to the RAN, and during a next, third transmission interval 108 the RAN transmits a second DL sub-frame 130. Between each sub-frame is a transition time interval, or gap 150, 152. More particularly, between DL sub-frame 110 and UL sub-frame 120 is a Transmit Transition Gap (TTG) 150 and between UL sub-frame 120 and DL sub-frame 130 is a Receive Transition Gap (RTG) 152. During these gaps, the UEs and RANs are not transmitting and are changing from a transmit or a receive mode to a receive or a transmit mode. Typically, these gaps are of a length corresponding to a round trip time delay to an edge of a coverage area of the RAN and a processing time delay involved in the UE or RAN processing a received message and switching modes.

Each DL sub-frame 110, 130 includes a DL scheduling field (DL-MAP) 114, 134, an UL scheduling field (UL-MAP) 116, 136, and a DL data packet field 118, 138. Each DL sub-frame 110, 130 further may include a preamble field 112, 132. DL scheduling field 114, 134 provides a frame duration, a frame number, a DL sub-band allocation for DL bursts, and a coding and modulation scheme used for each DL burst. UL scheduling field 116, 136 provides UL sub-band scheduling for UL bursts, a coding and modulation scheme used for each UL burst, and a start time for each UL burst. DL data packet field 118, 138 comprises the DL bursts, that is, is the field in which the RAN transmits data packets to the served UEs based on the sub-band scheduling and the determined beamforming weights. Preamble field 112, 132 typically comprises pilots that may be used by UEs for timing synchronization, frequency synchronization, and channel estimation.

UL sub-frame 120 includes an UL data packet field 122 and a sounding zone 124. UL data packet field 122 comprises UL bursts, that is, is the field in which the UEs transmit data packets to the RAN based on UL scheduling field 116. Sounding zone 124 is a field in which each of one or more UEs served the RAN transmits, over the frequency carriers allocated to the UE, a predetermined OFDM symbol known to both the RAN and the UE. Channel sounding assumes a reciprocity of the UL and DL channels and also assumes the RAN has a means of accounting for any non-reciprocities that may exist in the RAN transceiver hardware. Based on the received symbol the RAN is then able to determine a RAN-to-UE channel response. For example, as depicted in FIG. 1, a UE may transmit an OFDM symbol, that is, a known waveform, to a serving RAN in sounding zone 124 of UL frame 120, during time interval 106, and over designated sub-carriers of the frequency bandwidth 102. Based in the received symbol, the RAN is able to estimate a RAN-to-UE channel response, schedule a sub-band comprising a set of sub-carriers 126 for a downlink transmission to the UE, and determine a set of weights for the DL transmission to the UE over the scheduled set of sub-carriers. The RAN then conveys a DL burst 140 to the UE in a DL data packet field 138 of DL sub-frame 130 transmitted during the next time interval 108. The DL burst is transmitted over the scheduled set of sub-carriers and sub-band using the set of weights determined based on the received sounding zone symbol.

A drawback of channel sounding is that it consumes a significant overhead. That is, channel sounding takes up a symbol in an UL sub-frame for each reporting UE. In OFDMA communication systems, where the frequency domain consists of many sub-bands, each sub-band may require a channel feedback. Therefore, providing such feedback, especially in closed-loop MIMO systems where feedback is needed for beamforming DL transmissions to each served UE, can be significant.

Accordingly, there is a need for a method and apparatus for an OFDMA system that provides an improved channel sounding design.

DETAILED DESCRIPTION OF THE INVENTION

To address the need for a method and an apparatus for an Orthogonal Frequency Division Multiplexing (OFDM) system that provides an improved channel sounding design, an OFDM communication system is provided that schedules a transmission of uplink sounding signals or channel quality feedback signals in sounding intervals, or sounding zones, that are outside of the sub-frames, thereby preserving sub-frame capacity for other overhead and data transmissions.

Generally, an embodiment of the present invention encompasses a method for providing channel sounding in an Orthogonal Frequency Division Multiplexing (OFDM) communication system, the method comprising instructing a user equipment (UE) to transmit one or more of a sounding signal and a channel quality feedback signal in a sounding interval between two adjacent sub-frames.

Another embodiment of the present invention encompasses a method for providing channel sounding in an OFDM communication system, the method comprising receiving an instruction to transmit one or more of a sounding signal and a channel quality feedback signal in a sounding interval outside of all sub-frames and, in response to receiving the instruction, transmitting one or more of a sounding signal and a channel quality feedback signal in a sounding interval between two adjacent sub-frames.

Yet another embodiment of the present invention encompasses a scheduler that provides channel sounding in an OFDM communication system, wherein the scheduler is configured to instruct a UE to transmit one or more of a sounding signal and a channel quality feedback signal in a sounding interval between two adjacent sub-frames.

Still another embodiment of the present invention encompasses a user equipment (UE) that is capable of operating in an OFDM communication system and that is configured to receive an instruction to transmit one or more of a sounding signal and a channel quality feedback signal in a sounding interval outside of all sub-frames and, in response to receiving the instruction, transmit one or more of a sounding signal and a channel quality feedback signal in a sounding interval between two adjacent sub-frames.

Figure 2:
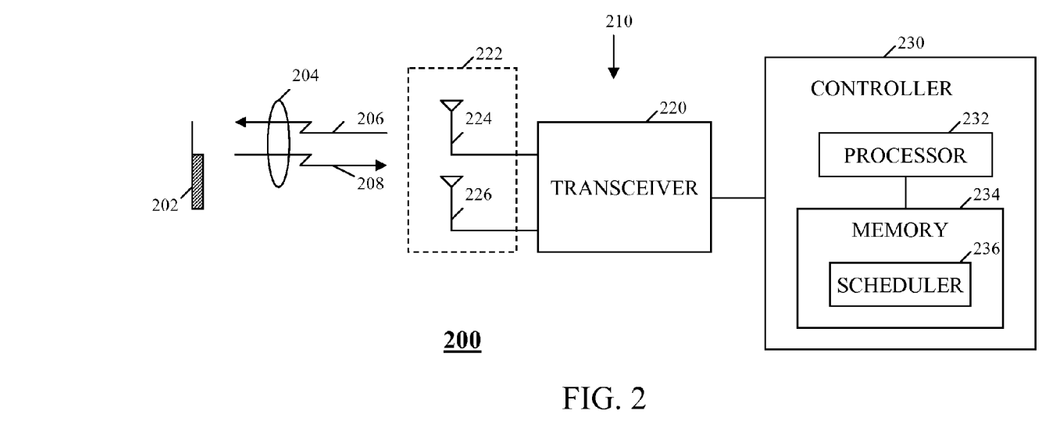
FIG. 2 is a block diagram of a wireless communication system in accordance with an embodiment of the present invention.

The present invention may be more fully described with reference to FIGS. 2-6B. FIG. 2 is a block diagram of a wireless communication system 200 in accordance with an embodiment of the present invention. Communication system 200 includes a user equipment (UE) 202, such as but not limited to a cellular telephone, a radio telephone, a personal digital assistant (PDA) with radio frequency (RF) capabilities, or a wireless modem that provides RF access to digital terminal equipment (DTE) such as a laptop computer. In various technologies, UE 202 may be referred to as a mobile station (MS), subscriber unit (SU), access terminal (AT), and so on. Communication system 200 further includes a Radio Access Network (RAN) 210 that provides communication services to UE 202 via an air interface 204. RAN 210 includes a transceiver 220, such as a Node B or a Base Transceiver Station (BTS) or simply a Base Station (BS), in wireless communication with UE 202 and further includes a network controller 230, such as a Radio Network Controller (RNC) or a Base Station Controller (BSC), coupled to the transceiver. Air interface 204 comprises a downlink (DL) 206 and an uplink (UL) 208. Each of DL 206 and UL 208 comprises multiple physical communication channels, including multiple control channels and multiple traffic channels.

Transceiver 220 is coupled to an antenna array 222 via a duplexer. Antenna array 222 comprises multiple antenna elements 224, 226 (two shown). By utilizing an antenna array to transmit signals to a UE located in a coverage area, such as a cell or sector serviced by the antenna array, RAN 210 is able to utilize a beamforming and/or MIMO technique for the transmission of the signals. Controller 230 includes a processor 232, such as one or more microprocessors, microcontrollers, digital signal processors (DSPs), combinations thereof or such other devices known to those having ordinary skill in the art. The particular operations/functions of processor 232, and thus of controller 230, are determined by an execution of software instructions and routines that are stored in a respective at least one memory device 234 associated with the processor, such as random access memory (RAM), dynamic random access memory (DRAM), and/or read only memory (ROM) or equivalents thereof, that store data and programs that may be executed by the corresponding processor.

RAN 210 further includes a scheduler 236 that performs the scheduling functions described herein as being performed by the RAN, such as scheduling DL and UL data bursts for UEs serviced by the RAN, such as UE 202. As depicted in FIG. 2, scheduler 236 comprises data and software maintained in the at least one memory device 234 of controller 230 and implemented by processor 232 of the controller. However, in various other embodiments of the invention, scheduler 236 may be maintained in a memory of, and implemented by a processor of, transceiver 220, may comprise functions distributed between the transceiver and controller, or may be included in a network element separate from, and coupled to, the transceiver and the controller and comprising its own processor and at least one memory device.

Figure 3:
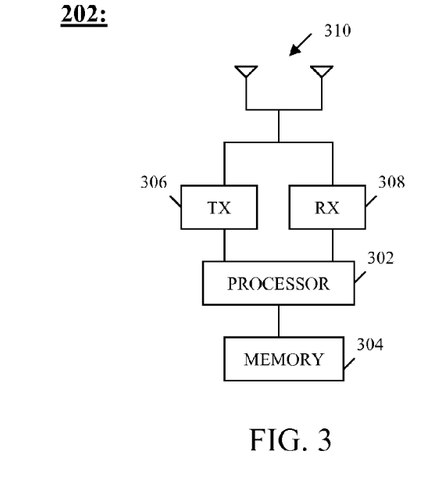
FIG. 3 is a block diagram of a user equipment in accordance with an embodiment of the present invention.
Figure 4:
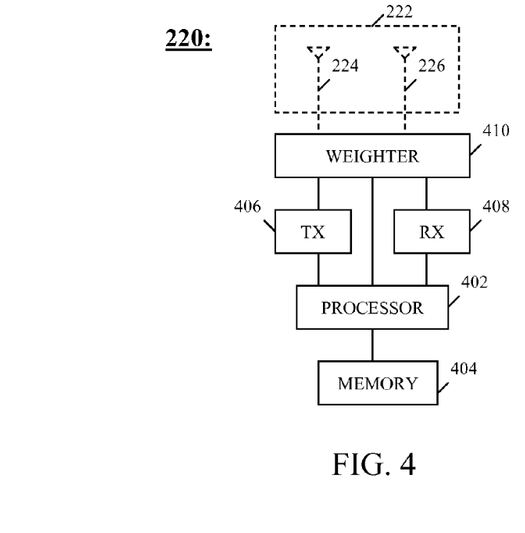
FIG. 4 is a block diagram of a transceiver in accordance with an embodiment of the present invention.

Referring now to FIGS. 3 and 4, block diagrams respectively are provided of UE 202 and transceiver 220 in accordance with an embodiment of the present invention. Each of UE 202 and transceiver 220 includes a respective processor 302, 402, such as one or more microprocessors, microcontrollers, digital signal processors (DSPs), combinations thereof or such other devices known to those having ordinary skill in the art. The particular operations/functions of processors 302, 402 and respectively thus of UE 202 and transceiver 220, are determined by an execution of software instructions and routines that are stored in a respective at least one memory device 304, 404 associated with the processor, such as random access memory (RAM), dynamic random access memory (DRAM), and/or read only memory (ROM) or equivalents thereof, that store data and programs that may be executed by the corresponding processor.

Each of UE 202 and transceiver 220 further includes a respective transmitter 306, 406 and a respective receiver 308, 408, which transmitter and receiver are each coupled to the processor 302, 402 of the UE and transceiver. UE 202 further includes one or more antennas 310, and transceiver 220 further includes a weighter 410 that is coupled to processor 402 and that is interposed between antenna array 222 and each of transmitter 406 and receiver 408. Weighter 410 weights signals applied to the multiple antenna elements 224, 226 of antenna array 222 based on a sounding signal received from UE 202 in order to beamform the signals for transmission to the UE over downlink 206.

Transceiver 220 further maintains, in at least one memory device 404 or weighter 410, a weighting matrix, which weighting matrix comprises multiple sets of weights and wherein each set of weights is associated with a UE and a combination of antenna elements for downlink DL to the UE, and provides the weights applicable to signals conveyed to each of the antenna elements for such a DL transmission. For each UE, the weights are determined by RAN 210 based on a UL sounding signal received from the UE. That is, based on the UL sounding signal, RAN 210 determines a channel response associated with the UE and computes a set of complex weights based on the determined channel response. The set of complex weights can be Eigen Beamforming (EBF) or Max-Ratio Transmission (MRT) vectors derived from the UL sounding signal measurements.

The embodiments of the present invention preferably are implemented within UE 202, transceiver 220, and controller 230, and more particularly with or in software programs and instructions stored in the respective at least one memory devices 304, 404, 234 and executed by respective processors 302, 402, 232. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UE 202, transceiver 220, and controller 230. Based on the present disclosure, one skilled in the art will be readily capable of producing and implementing such software and/or hardware without undo experimentation. Furthermore, unless otherwise specified herein, the functions described herein as being performed by RAN 210 preferably are performed by scheduler 236, and more particularly by a processor associated with the scheduler based on programs and instructions stored in an at least one memory device associated with the scheduler.

Communication system 200 comprises a Multiple-Input Multiple-Output (MIMO) and/or smart antenna packet data communication system that employs an Orthogonal Frequency Division Multiple Access (OFDMA) modulation scheme for transmitting data over air interface 204, wherein a frequency channel, or bandwidth, 502 (FIG. 5) is split into multiple frequency sub-bands, or resource blocks, during a given time period. Each sub-band comprises multiple orthogonal frequency sub-carriers over a given number of OFDM symbols, that are the physical layer channels over which traffic and signaling channels are transmitted in a TDM or TDM/FDM fashion. A communication session may be assigned a sub-band or a group or groups of sub-bands for an exchange of bearer information, thereby permitting multiple users to transmit simultaneously on the different sub-bands such that each user's transmission is orthogonal to the other users' transmissions.

In addition, communication system 200 preferably comprises a Worldwide Interoperability for Microwave Access (WiMAX) communication system that operates in accordance with the IEEE (Institute of Electrical and Electronics Engineers) 802.16 standards, which standards specify wireless telecommunications system operating protocols, including radio system parameters and call processing procedures. However, those who are of ordinary skill in the art realize that communication system 200 may operate in accordance with any wireless telecommunication system employing an Orthogonal Frequency Division Multiplexing (OFDM) modulation scheme, such as a 3GPP (Third Generation Partnership Project) E-UTRA (Evolutionary UMTS Terrestrial Radio Access) communication system, a 3GPP2 (Third Generation Partnership Project 2) Evolution communication system, for example, a CDMA (Code Division Multiple Access) 2000 1XEV-DV communication system, a Wireless Local Area Network (WLAN) communication system as described by the IEEE 802.xx standards, for example, the 802.11a/HiperLAN2, 802.11g, or 802.20 standards, or any of multiple proposed ultrawideband (UWB) communication systems.

In order to determine the antenna weights used to beamform DL transmissions to a UE, communication system 100 utilizes non-sub-frame UL transmissions to perform channel sounding. By using non-sub-frame UL transmissions, the capacity of an UL sub-frame consumed by sounding symbols in the prior art may instead be used for UL data bursts or other overhead messages, improving system capacity.

Figure 5:
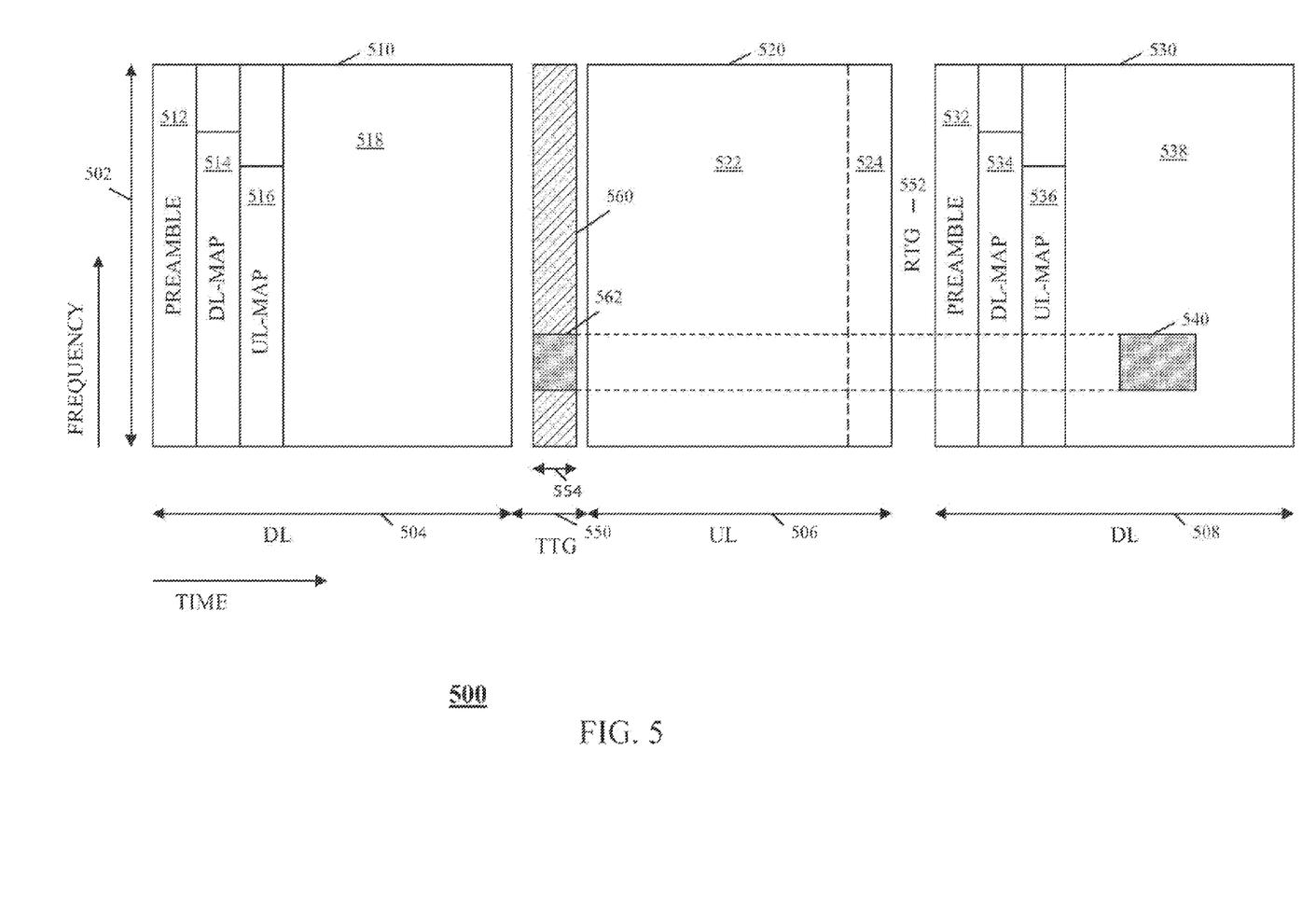
FIG. 5 is a block diagram of a scheme for channel sounding of a frequency bandwidth of the communication system of FIG. 2 in accordance with an embodiment of the present invention.

Referring now to FIG. 5, a block diagram 500 is provided that depicts a scheme for channel sounding of a frequency bandwidth 502 of communication system 200 in accordance with an embodiment of the present invention. As depicted in FIG. 5, during a first transmission interval 504, RAN 210 transmits a first downlink (DL) sub-frame 510. During a next, second transmission interval 506, UE 202 transmits an uplink (UL) sub-frame 520 to the RAN, and during a next, third transmission interval 508 the RAN transmits a second DL sub-frame 530. Between each sub-frame is a transition time interval, or gap 550, 552. More particularly, between DL sub-frame 510 and UL sub-frame 520 is a Transmit Transition Gap (TTG) 550 and between UL sub-frame 520 and DL sub-frame 530 is a Receive Transition Gap (RTG) 552. In the prior art, during these gaps UE 202 and RAN 210 are not transmitting and are changing from a transmit or a receive mode to a receive or a transmit mode. Typically, these gaps are of a length corresponding to a round trip time delay to an edge of a coverage area of RAN 210 and a processing time delay involved in UE 202 or RAN 210 processing a received message and switching modes.

Similar to DL sub-frames 110 and 130 of the prior art, each DL sub-frame 510, 530 includes a DL scheduling field (DL-MAP) 514, 534, an UL scheduling field (UL-MAP) 516, 536, and a DL data packet field 518, 538. Each DL sub-frame 510, 530 further may include a preamble field 512, 532. DL scheduling field 514, 534 provides a frame duration, a frame number, a DL sub-band allocation for DL bursts, and a coding and modulation scheme used for each DL burst. UL scheduling field 516, 536 provides UL sub-band scheduling for UL bursts, a coding and modulation scheme used for each UL burst, and a start time for each UL burst. DL data packet field 518, 538 comprises the DL bursts, that is, is the field in which the RAN transmits data packets to the served UEs based on the sub-band scheduling and the determined beamforming weights. Preamble field 512, 532 typically comprises pilots that may be used by a UE, such as UE 202, for timing synchronization, frequency synchronization, and channel estimation.

Similar to UL sub-frame 120, UL sub-frame 520 includes an UL data packet field 522. UL data packet field 522 comprises UL bursts, that is, is the field in which the UEs transmit data packets to the RAN based on UL scheduling field 116. However, unlike a communication system of the prior art, communication system 200 does not perform sounding inside an UL sub-frame. Instead, in communication system 200, UE 202 transmits sounding signals during a sounding interval, or time period, 554 that is between DL sub-frame 510 and UL sub-frame 520, and more particularly that is in TTG 550.

That is, communication system 200 includes a sounding zone 560 in TTG 550. Similar to prior art sounding zones, the sounding zone is a field in which one or more UEs served by a RAN, such as UE 202 served by RAN 210, transmits, over designated sub-carriers of the frequency bandwidth 502, a sounding signal, that is, a signal transmitted in a sounding zone or sounding interval and comprising a predetermined OFDM symbol ('sounding symbol') that is known to both the RAN, that is, RAN 210, and the UE, that is, UE 202. The predetermined symbol is maintained in the at least one memory device of the RAN, such as one or more of the at least one memory devices 234 and 404, and in the at least one memory device 304 of the UE. In other embodiments of the present invention, the UE may transmit, in addition to or instead of the sounding signal, other forms of channel quality feedback in the sounding zone or sounding interval as is described in greater detail below. In one embodiment of the present invention, each active UE served by the RAN, for example, one or more UEs actively engaged in communications with the RAN (as opposed to idle UEs), may self-determine to transmit, and then transmit, the sounding signal or other channel quality feedback signal in sounding zone 560, that is, during sounding period 554 that is outside of all sub-frames 510, 520, and 530, that is, is between adjacent sub-frames 510 and 520, or in other words between intervals 504 and 506. In another embodiment of the present invention, only UEs instructed by RAN 210 to transmit the sounding signal or other channel quality feedback signal then transmit a sounding signal in sounding zone 560, that is, during sounding interval 554.

For example, as depicted in FIG. 5, UE 202 may transmit a sounding signal/channel quality feedback signal to a serving RAN in sounding zone 560, during TTG 550, and over designated sub-carriers of the frequency bandwidth 502. Based in the received signal, RAN 210 estimates a RAN-to-UE channel response using techniques known in the art, schedules a sub-band comprising sub-carriers 562 for the UE, and determines a set of weights for a DL transmission to the UE over the scheduled sub-band. RAN 210 then conveys a DL burst 540 to the UE in DL data packet field 538 of DL sub-frame 530, which sub-frame is transmitted during the next sub-frame time interval 508. The DL burst is transmitted over the scheduled sub-band and using the set of weights determined based on the received sounding zone symbol.

In other embodiments of the present invention, rather than, or in addition to, being used to enable a UE, such as UE 202, to transmit a sounding signal, the time interval 560 may be used to support one or more of multiple other forms of feedback which can be similarly used by RAN 210 to compute the set of weights for DL transmission over the scheduled sub-band. One form of feedback is direct channel feedback, which is a technique contained within the IEEE 802.16 standard wherein the UE transmits an encoded waveform (within time interval 560 in this embodiment), and the encoded waveform conveys the channel response between each transmit antenna on the RAN and each receive antenna on the UE. In another embodiment of the present invention, time interval 560 may be used for covariance feedback, which is a technique wherein the UE measures the RAN-to-UE channel response, computes a spatial covariance matrix, and transmits an encoded waveform (within time interval 560 in this embodiment), and the encoded waveform conveys the entries of the downlink spatial covariance matrix. In yet another embodiment, time interval 560 may be used for eigenvector feedback, which is a technique wherein the UE measures the RAN-to-UE channel response, computes a spatial covariance matrix, computes the eigenvectors of that spatial covariance matrix, and transmits an encoded waveform (within time interval 560 in this embodiment), and the encoded waveform conveys the entries of the eigenvectors of the downlink spatial covariance matrix. All of these embodiments involve the UE measuring the RAN-to-UE channel response and computing a characteristic of the RAN-to-UE channel response, where the characteristic of the RAN-to-UE channel response is the actual channel response (for direct channel feedback), the spatial covariance matrix (for covariance feedback), or the eigenvectors of the spatial covariance matrix (for eigenvector feedback). All of these alternative embodiments involve the UE transmitting back a channel quality feedback signal comprising an encoded waveform (rather than a sounding symbol) within TTG interval 560. Additionally, other forms of feedback that involve feedback transmissions from the UE that can fit within the TTG interval 560 are also possible and are within scope of the present invention. Examples of other forms of feedback are channel quality indicator (CQI) feedback, MIMO rank feedback, Carrier-to-infererence-plus-noise-ratio (CINR) feedback, preferred modulation and coding strategy (MCS) feedback, channel condition feedback, and other related forms of feedback that are oriented towards adapting the data rate and MIMO transmission strategy of the RAN-to-UE link.

Figure 6A:
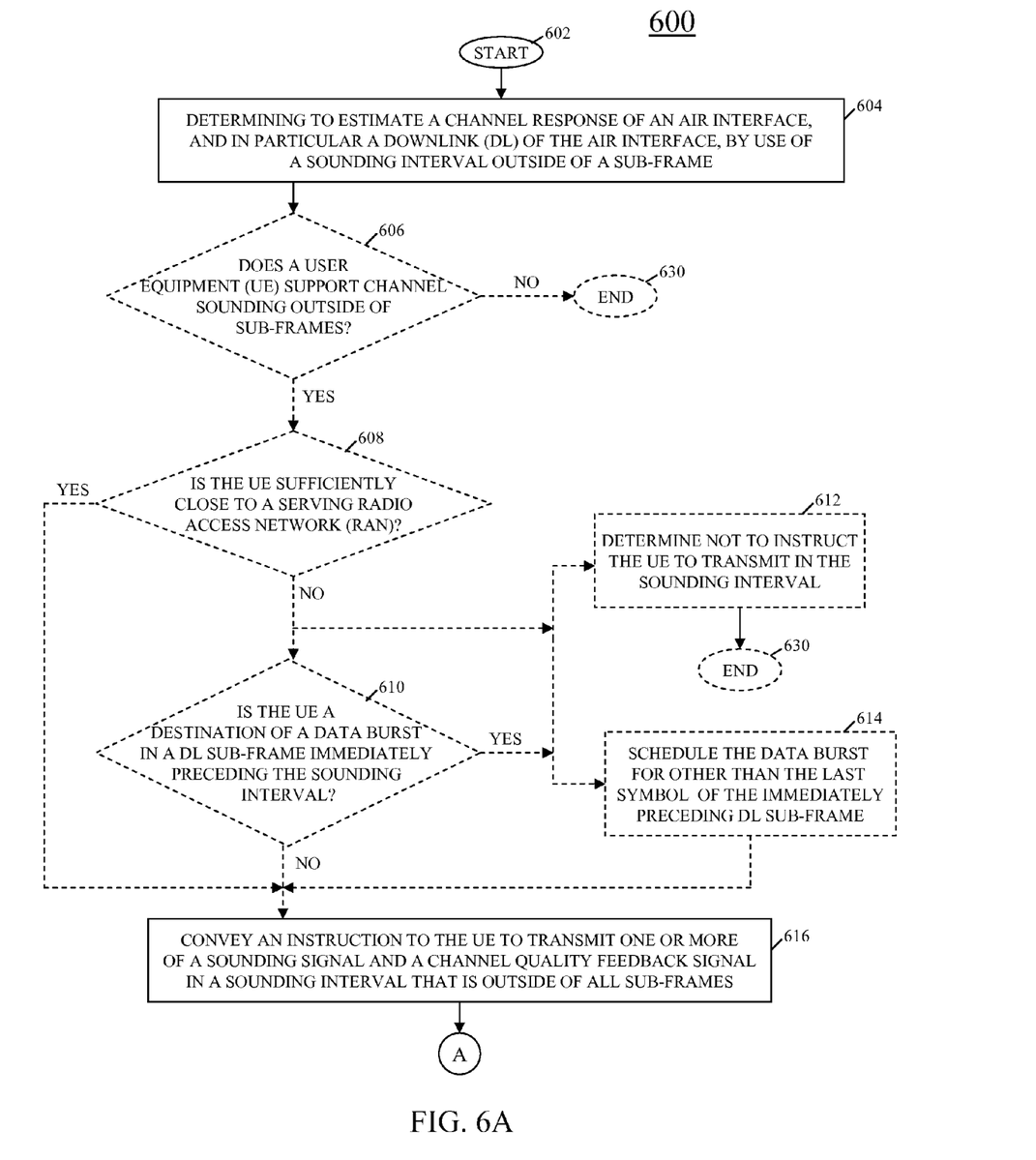
FIG. 6A is a logic flow diagram of a method for channel sounding of a frequency bandwidth of the communication system of FIG. 2 in accordance with various embodiments of the present invention.
Figure 6B:
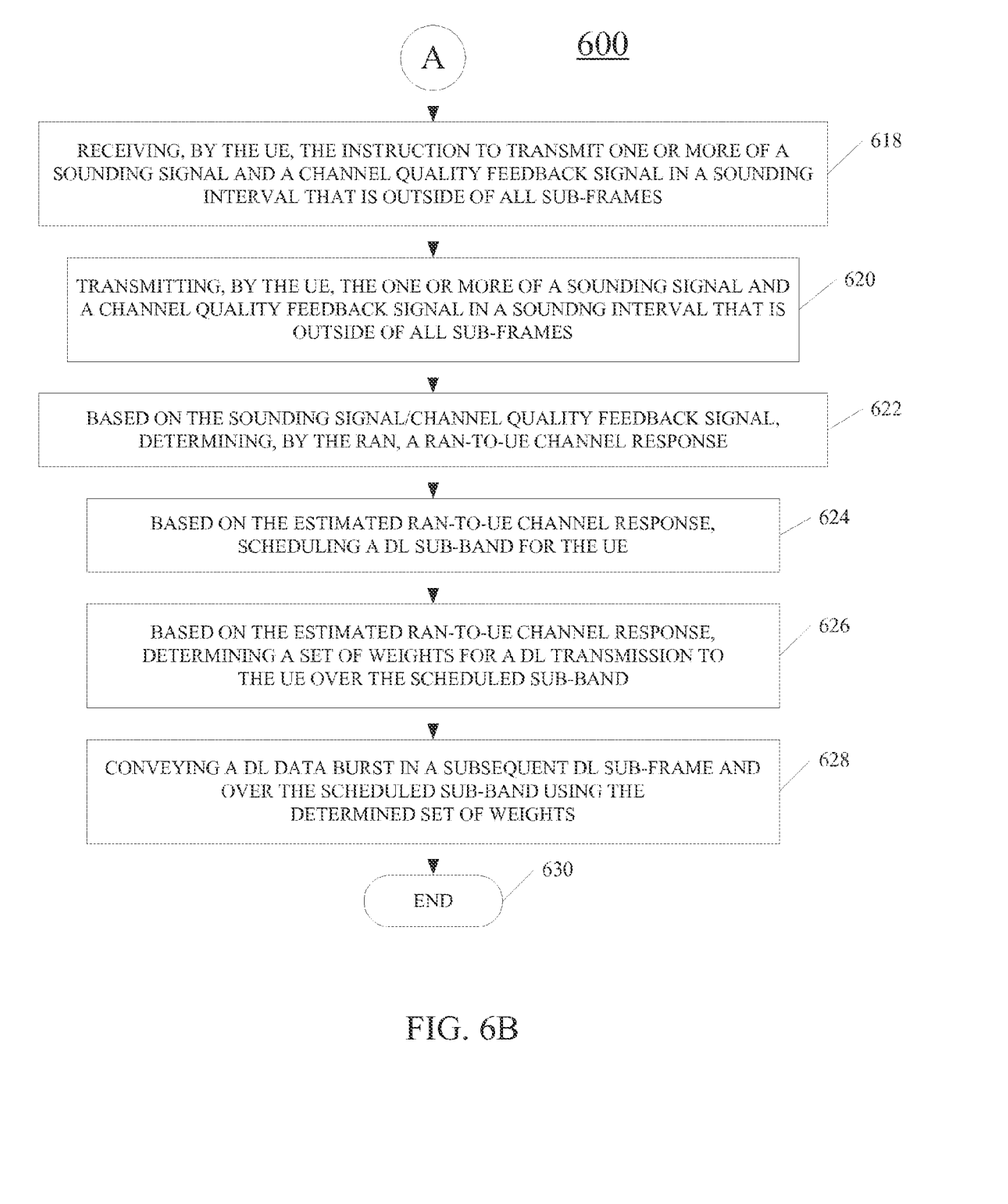
FIG. 6B is a continuation of the logic flow diagram of FIG. 6A depicting a method for channel sounding of a frequency bandwidth of the communication system of FIG. 2 in accordance with various embodiments of the present invention.

Referring now to FIGS. 6A and 6B, a logic flow diagram 600 is provided that depicts a method implemented by communication system 200 for channel sounding in accordance with various embodiments of the present invention. Logic flow diagram 600 begins (602) when RAN 210, and in particular scheduler 236, determines (604) to estimate a channel quality of air interface 204, and in particular of DL 206, by use of channel sounding. In order to estimate a channel quality of DL 206, and more particularly a RAN 210-to-UE 202 channel response, RAN 210 determines to measure a quality of UL 204. It is assumed that the UL and DL channel characteristics are the approximately the same. RAN 210, and in particular scheduler 236, then conveys (616) an instruction to UE 202 to perform channel sounding, that is, to transmit sounding signal comprising a known, predetermined OFDM symbol (a 'sounding symbol'), or to provide channel quality feedback as described in detail above, in a sounding interval that is outside of all sub-frames and prior to a next sub-frame, that is, sounding interval 554 in TTG 550. Preferably the instruction comprises a modified version of a PAPR Reduction/Safety Zone/Sounding Zone Allocation message that is modified to include a data field that includes an indication of whether a sounding zone, such as sounding zone 560, exists in a TTG interval, such as TTG interval 550.

In another embodiment of the invention, prior to conveying the instruction, RAN 210, and in particular controller 230 and more particularly scheduler 236, may determine (606) whether UE 202 supports channel sounding or channel quality feedback outside of sub-frames. For example, in one such embodiment of the invention, when UE 202 registers with communication system 200, the UE may provides its capabilities to RAN 210 in an overhead message transmitted over UL 208, including whether the UE supports channel sounding or channel quality feedback outside of sub-frames. In another such embodiment of the invention, when UE 202 registers with RAN 210, the RAN or a network element in communication with the RAN, such as a Mobile Switching Center (MSC) or a Packet Data Service Node (PDSN), may retrieve the UE's capabilities, including whether the UE supports channel sounding/channel quality feedback outside of sub-frames, from a network database, such as a Home Location Register (HLR), a Visited Location Register (VLR), or a Home Subscriber Server (HSS). If this information is retrieved by a network element in communication with the RAN 210, the RAN then obtains the information from the network element. If the UE 202 does not support channel sounding/channel quality feedback outside of sub-frames, then logic flow 600 ends (630). If the UE 202 supports channel sounding/channel quality feedback outside of sub-frames, then the RAN may proceed to step 616, that is, instruct the UE to perform the channel sounding/channel quality feedback in sounding interval 554.

In yet another embodiment of the invention, prior to conveying the instruction to UE 202, RAN 210, and in particular scheduler 236, may determine (610) whether UE 202 is the destination of a data burst in the DL sub-frame immediately preceding sounding interval 554, that is, DL sub-frame 510. In one such embodiment, if the UE is the destination of a data burst in DL sub-frame 510, RAN 210 may determine (612) not to instruct the UE to transmit in sounding interval 554 and logic flow 600 ends (630). In another such embodiment, RAN 210 may schedule (614) the data burst for other than the last time slot, or symbol, of preceding DL sub-frame 510 and may proceed to step 616, that is, may instruct the UE to perform the channel sounding/channel quality feedback in sounding interval 554.

That is, since sounding interval 554 follows so close to the end of DL sub-frame 510, RAN 210 may want to instruct UE 202 to transmit in sounding interval 554 only if the UE is not the destination of a data burst in preceding DL sub-frame 510 or only if the data burst may be scheduled for a time slot other than at the end of the sub-frame, that is, other the last symbol. By instructing UE 202 to transmit in sounding interval 554 only if the UE is not the destination of a data burst in preceding DL sub-frame 510 or by scheduling any data burst intended for the UE at other than the end of the sub-frame, RAN 210 enables UE 202 to start transmitting an UL sounding signal at, or very near, the end of the DL sub-frame.

In still another embodiment of the invention, prior to conveying the instruction to UE 202, RAN 210, and in particular scheduler 236, may determine (608) a proximity of the UE to the RAN. If the UE is close enough to the RAN, then logic flow 600 may proceed to step 616 and RAN 210, and in particular scheduler 236, may instruct the UE to transmit in sounding interval 554 regardless of whether the UE is the destination of a data burst in the preceding DL sub-frame 510 or even at the end of the sub-frame. However, if the UE is sufficiently far from the RAN, then RAN 210, and in particular scheduler 236, may determine (612) not to instruct the UE to transmit in sounding interval 554, or RAN 210 may proceed to step 610 described above, that is, determine whether UE 202 is the destination of a data burst in the DL sub-frame immediately preceding sounding interval 554, that is, DL sub-frame 510, and proceeding accordingly.

That is, a UE closer to RAN 210 has a shorter round trip propagation delay than a more distant UE and, in turning around communications with the RAN, may consume less of a TTG, such as TTG 550, than the more distant UE. Therefore, a UE closer to RAN 210 may be able to receive data at the end of sub-frame and, prior to the end of a following TTG, switch from a receive mode to a transmit mode, and transmit a sounding signal/channel quality feedback signal to the RAN, and the RAN also may receive and process the signal/feedback. However, this may pose a greater problem for the more distant UE, which faces a longer round trip propagation delay. Therefore, in determining whether to convey an instruction to UE 202 to transmit a known, predetermined OFDM symbol in a sounding interval 550, or scheduling the data burst for such a UE in a time slot other than at the end of the sub-frame, that is, other the last symbol, RAN 210, and in particular scheduler 236, may consider a proximity of the UE to the RAN.

For example, RAN 210 may determine a location of UE 202 based on times of arrival or time differences of arrival of signals transmitted to the UE from multiple transceivers (and provided by the UE to the RAN) or transmitted to multiple transceivers from the UE, based on GPS (Global Positioning satellite System) location information provided by the UE, or based on any other of many well known location determination schemes. RAN 210 may further maintain, in an at least one memory device 234, 404, a location threshold. When the location of UE 202 is outside of the location threshold, for example, when a distance to the UE determined by the RAN exceeds a distance threshold maintained by the RAN, or a signal strength of a known signal received from the UE is less than a signal strength threshold maintained in an at least one memory device 234, 404 (since signal attenuation may correspond to a distance that the signal travels), then RAN 210 may determine to instruct UE 202 to transmit in sounding interval 550 only if the UE is not scheduled for a data burst in the preceding DL sub-frame 510, or the RAN may determine to schedule a data burst for such a UE in a time slot other than at the end of the sub-frame so as to enable the UE to transmit in sounding interval 550. On the other hand, when the location of UE 202 is inside the location threshold, for example, when a distance to the UE determined by the RAN is less than the distance threshold or a signal strength of a known signal received from the UE is greater than the signal strength threshold, then RAN 210 may proceed from step 608 directly to step 616 and instruct UE 202 to transmit in sounding interval 550 regardless of whether the UE is scheduled for a data burst at the end of the preceding DL sub-frame 510.

In response to RAN 210 conveying, at step 616, an instruction to UE 202 to transmit a sounding signal/channel quality feedback signal in sounding interval 554 in TTG 550, and the UE receiving (618) the instruction, the UE transmits (620), over designated sub-carriers of the frequency bandwidth 502, a sounding signal/channel quality feedback signal in sounding zone 560, that is, during sounding period 554 that is outside of sub-frames 510, 520, and 530, that is, is between adjacent sub-frames 510 and 520, or in other words between sub-frame intervals 504 and 506. Based on the received sounding signal/channel quality feedback signal, RAN 210, and in particular scheduler 236, determines (622) a RAN-to-UE channel response using techniques known in the art. Based on the determined RAN-to-UE channel response, RAN 210, and in particular scheduler 236, schedules (624) a sub-band comprising sub-carriers 562 for a DL transmission to the UE and determines (626) a set of weights in association with the multiple antenna elements 224, 226 of antenna array 222 for a DL transmission to the UE over the scheduled sub-band. The set of weights then may be stored in at least one memory device 234. In other embodiments of the present invention, the set of weights may be determined by transceiver 220, and in particular by processor 232, and then stored in at least one memory device 420 or weighter 410. At some point, these weights then are conveyed to weighter 410 and RAN 210 then conveys (628) a DL data burst 540 to the UE in a DL data packet field of a subsequent DL sub-frame that is transmitted during subsequent sub-frame transmission interval, such as DL data packet field 538 of the next DL sub-frame 530 that is transmitted during the next time interval 508. The DL data burst is transmitted over the scheduled sub-band via antenna array 222, wherein weighter 410 applies, to a signal applied to each of the multiple antenna elements 224, 226, a weight of the set of weights that are determined based on the received sounding signal. In various embodiments of the present invention, the weights may be used for a transmission via a subsequent sub-frame other than the next sub-frame or may be used for transmissions via multiple subsequent sub-frames. Logic flow 600 then ends (630).

By scheduling transmissions of uplink sounding signals/channel quality feedback signals in sounding intervals, or sounding zones, that are outside of the sub-frames, communication system 200 preserves sub-frame capacity for other overhead and data transmissions. In one embodiment of the present invention, before instructing a UE to perform such channel sounding, communication system 200 may first determine that a UE supports channel sounding outside of sub-frames. In other embodiments of the invention, the communication system may condition non-sub-frame channel sounding or channel quality feedback on one or more of whether the UE is the destination of a data burst in a DL sub-frame immediately preceding a sounding interval and a proximity of the UE to a serving RAN. When the UE is the destination of a data burst in a DL sub-frame immediately preceding a sounding interval and/or is of a sufficiently great distance from the RAN, communication system 200 may determine to not instruct the UE to transmit in the sounding interval, or sounding zone, that is outside of a sub-frame, or communication system 200 may instruct the UE to transmit in the sounding interval, or sounding zone, and schedule the data burst of the immediately preceding sub-frame for a time slot other than at the end of the sub-frame or other than a last symbol of the sub-frame.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for providing channel sounding in an Orthogonal Frequency Division Multiplexing communication system, the method comprising:
   instructing, by a scheduler of a network controller, a user equipment to transmit a sounding signal, a channel quality feedback signal, or both the sounding signal and the channel quality feedback signal during a sounding interval within a Transmit Transition Gap, wherein the sounding interval is not within any downlink sub-frame or any uplink sub-frame; and
   receiving, by a radio access network, the sounding signal, the channel quality feedback signal, or both the sounding signal and the channel quality feedback signal from the user equipment in response to instructing the user equipment.

2. The method of claim 1, wherein instructing further comprises:
   determining whether the user equipment is a destination of a data burst in a downlink sub-frame immediately preceding the sounding interval; and
   in response to determining that the user equipment is not the destination of the data burst in the downlink sub-frame immediately preceding the sounding interval, instructing the user equipment to transmit the sounding signal, the channel quality feedback signal, or both the sounding signal and the channel quality feedback signal in a sounding zone during the Transmit Transition Gap.

3. The method of claim 1, wherein instructing further comprises:
   determining whether the user equipment is a destination of a data burst in a downlink sub-frame immediately preceding the sounding interval; and
   in response to determining that the user equipment is the destination of the data burst in the downlink sub-frame immediately preceding the sounding interval, scheduling the data burst for other than a last symbol of the preceding downlink sub-frame; and
   instructing the user equipment to transmit the sounding signal, the channel quality feedback signal, or both the sounding signal and the channel quality feedback signal in a sounding zone during the Transmit Transition Gap.

4. The method of claim 1, wherein instructing further comprises:
   determining a proximity of the user equipment to the radio access network; and
   based on the determined proximity of the user equipment to the radio access network, determining whether to instruct the user equipment to transmit the sounding signal, the channel quality feedback signal, or both the sounding signal and the channel quality feedback signal during the sounding interval within the Transmit Transition Gap.

5. The method of claim 1, wherein instructing further comprises:
   determining whether the user equipment supports transmission of the sounding signal, the channel quality feedback signal, or both the sounding signal and the channel quality feedback signal during the sounding interval not within any downlink sub-frame or uplink sub-frame; and in response to determining that the user equipment supports transmission of the sounding signal, the channel quality feedback signal, or both the sounding signal and the channel quality feedback signal during the sounding interval not within any downlink sub-frame or uplink sub-frame, instructing the user equipment to transmit the sounding signal, the channel quality feedback signal, or both the sounding signal and the channel quality feedback signal during the sounding interval within the Transmit Transition Gap.

6. The method of claim 1, further comprising receiving, by the radio access network, the sounding signal, the channel quality feedback signal, or both the sounding signal and the channel quality feedback signal from the user equipment and estimating a channel response based on the received sounding signal, the received channel quality feedback signal, or both the received sounding signal and the received channel quality feedback signal.

7. The method of claim 6, further comprising scheduling a downlink transmission to the user equipment based on the received sounding signal, the received channel quality feedback signal, or both the received sounding signal and the received channel quality feedback signal.

8. The method of claim 7, further comprising determining a set of weights in association with a plurality of antenna elements for the downlink transmission to the user equipment based on the received sounding signal, the received channel quality feedback signal, or both the received sounding signal and the received channel quality feedback signal.

9. A method for providing channel sounding in an Orthogonal Frequency Division Multiplexing communication system, the method comprising:

receiving an instruction, from a scheduler of a network controller, to transmit a sounding signal, a channel quality feedback signal, or both the sounding signal and the channel quality feedback signal during a sounding interval within a Transmit Transition Gap, wherein the sounding interval is not within any downlink sub-frame or any uplink sub-frame; and in response to receiving the instruction, transmitting, by a user equipment, the sounding signal, the channel quality feedback signal, or both the sounding signal and the channel quality feedback signal during the sounding interval within the Transmit Transition Gap.

10. A network controller that provides channel sounding in an Orthogonal Frequency Division Multiplexing communication system, wherein the network controller comprises:

a processor; and a scheduler coupled to the processor, the scheduler configured to instruct a user equipment to transmit a sounding signal, a channel quality feedback signal, or both the sounding signal and the channel quality feedback signal during a sounding interval within a Transmit Transition Gap, wherein the sounding interval is not within any downlink sub-frame or any uplink sub-frame.

11. The network controller of claim 10, wherein a sounding zone is located within the sounding interval, and wherein the scheduler is further configured to instruct the user equipment to transmit the sounding signal, the channel quality feedback signal, or both the sounding signal and the channel quality feedback signal in the sounding zone during the Transmit Transition Gap.

12. The network controller of claim 10, wherein the scheduler is further configured to instruct the user equipment to transmit by determining whether the user equipment is a destination of a data burst in a downlink sub-frame immediately preceding the sounding interval and, in response to determining that the user equipment is not the destination of the data burst in the downlink sub-frame immediately preceding the sounding interval, instructing the user equipment to transmit the sounding signal, the channel quality feedback signal, or both the sounding signal and the channel quality feedback signal in a sounding zone during the Transmit Transition Gap.

13. The network controller of claim 10, wherein the scheduler is further configured to instruct the user equipment to transmit by determining whether the user equipment is a destination of a data burst in a downlink sub-frame immediately preceding the sounding interval, in response to determining that the user equipment is the destination of the data burst in the downlink sub-frame immediately preceding the sounding interval, scheduling the data burst for other than a last symbol of the preceding downlink sub-frame, and instructing the user equipment to transmit the sounding signal, the channel quality feedback signal, or both the sounding signal and the channel quality feedback signal in a sounding zone during the Transmit Transition Gap.

14. The network controller of claim 10, wherein the scheduler is further configured to instruct the user equipment to transmit by determining a proximity of the user equipment to a radio access network and, based on the determined proximity of the user equipment to the radio access network, determining whether to instruct the user equipment to transmit the sounding signal, the channel quality feedback signal, or both the sounding signal and the channel quality feedback signal during the sounding interval within the Transmit Transition Gap.

15. The network controller of claim 10, wherein the scheduler is further configured to instruct the user equipment to transmit by determining whether the user equipment supports transmission of the sounding signal, the channel quality feedback signal, or both the sounding signal and the channel quality feedback signal in the sounding interval, and, in response to determining that the user equipment supports transmission of the sounding signal, the channel quality feedback signal, or both the sounding signal and the channel quality feedback signal in the sounding interval, instructing the user equipment to transmit the sounding signal, the channel quality feedback signal, or both the sounding signal and the channel quality feedback signal during the sounding interval within the Transmit Transition Gap.

16. The network controller of claim 10, wherein the scheduler is further configured to receive the sounding signal, the channel quality feedback signal, or both the sounding signal and the channel quality feedback signal from the user equipment and estimate a channel response based on the received sounding signal, the received channel quality feedback signal, or both the received sounding signal and the received channel quality feedback signal.

17. The network controller of claim 16, wherein the scheduler is further configured to schedule a downlink transmission to the user equipment based on the received sounding signal, the received channel quality feedback signal, or both the received sounding signal and the received channel quality feedback signal.

18. A radio access network comprising the network controller of claim 10.

19. The radio access network of claim 18, wherein the radio access network comprises a plurality of antenna elements and is configured to receive the sounding signal, the channel quality feedback signal, or both the sounding signal and the channel quality feedback signal from the user equipment, estimate a channel response based on the received sounding signal, the received channel quality feedback signal, or both the received sounding signal and the received channel quality feedback signal, and determine a set of weights in association with the plurality of antenna elements for a downlink transmission to the user equipment based on the received sounding signal, the received channel quality feedback signal, or both the received sounding signal and the received channel quality feedback signal.

20. A user equipment that is capable of operating in an Orthogonal Frequency Division Multiplexing communication system, wherein the user equipment comprises:
   a memory; and
   a processor coupled to the memory, the processor configured to receive, from a radio access network, an instruction to transmit a sounding signal, a channel quality feedback signal, or both the sounding signal and the channel quality feedback signal during a sounding interval, wherein the sounding interval is not within any downlink sub-frame or any uplink sub-frame, and, in response to receiving the instruction, transmit the sounding signal, the channel quality feedback signal, or both the sounding signal and the channel quality feedback signal during the sounding interval within a Transmit Transition Gap.

21. The user equipment of claim 20, wherein a sounding zone is located within the sounding interval and wherein the processor of the user equipment transmits the sounding signal, the channel quality feedback signal, or both the sounding signal and the channel quality feedback signal in the sounding zone during the Transmit Transition Gap.

* * * * *